US012362466B2

(12) United States Patent
Lee

(10) Patent No.: US 12,362,466 B2
(45) **Date of Patent: *Jul. 15, 2025**

(54) VEHICLE AND ANTENNA APPARATUS FOR VEHICLE

(71) Applicants: HYUNDAI MOTOR COMPANY, Seoul (KR); KIA CORPORATION, Seoul (KR)

(72) Inventor: Sang Heun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 303 days.

This patent is subject to a terminal disclaimer.

(21) Appl. No.: 17/991,187

(22) Filed: Nov. 21, 2022

(65) Prior Publication Data

US 2023/0178880 A1 Jun. 8, 2023

(30) Foreign Application Priority Data

Dec. 6, 2021 (KR) ........................ 10-2021-0172871

(51) Int. Cl.
*H01Q 1/32* (2006.01)

(52) U.S. Cl.
CPC ................................ *H01Q 1/3275* (2013.01)

(58) Field of Classification Search
CPC ...... H01Q 1/3275; H01Q 1/362; H01Q 5/307; H01Q 5/40; H01Q 1/1214; H01Q 21/28; H01Q 1/06; H01Q 5/328; B60Q 1/26; B60Q 1/482; G08B 5/36; H04B 1/18; H04B 1/006; H04B 1/1027; H04B 2001/1072; H04B 1/082
See application file for complete search history.

(56) References Cited

U.S. PATENT DOCUMENTS

2019/0176717 A1* 6/2019 Gomes .................... B60R 11/04
2019/0280372 A1* 9/2019 Terashita ................. H01Q 9/36

FOREIGN PATENT DOCUMENTS

JP 2019068277 A * 4/2019

OTHER PUBLICATIONS

Translation of JP-2019068277-A (Year: 2019).*

* cited by examiner

*Primary Examiner* — Renan Luque

(74) *Attorney, Agent, or Firm* — Morgan, Lewis & Bockius LLP

(57) ABSTRACT

A vehicle including a plurality of antennas, wherein the vehicle includes: a roof panel installed on an upper side of the vehicle; a first roof rail and a second roof rail arranged side by side on the roof panel; and a first antenna module and a second antenna module provided on the roof panel. The first antenna module is provided in a coupling area, in which the first roof rail is coupled to the roof panel, the first antenna module is inserted into the first roof rail. The second antenna module is provided in a coupling areal, in which the second roof rail is coupled to the roof panel, the second antenna module is inserted into the second roof rail. Antennas included in each of the first and second antenna modules are disposed according to operating frequencies thereof in each of the first and second antenna modules.

17 Claims, 10 Drawing Sheets

VEHICLE AND ANTENNA APPARATUS FOR VEHICLE

CROSS-REFERENCE TO RELATED APPLICATION

This application is based on and claims priority under 35 U.S.C. § 119 to Korean Patent Application No. 10-2021-0172871, filed on Dec. 6, 2021 in the Korean Intellectual Property Office, the disclosure of which is incorporated herein by reference.

BACKGROUND

1. Technical Field

The disclosure relates to a vehicle and an antenna for a vehicle, and more specifically, to a vehicle including an antenna apparatus built into a roof rail of the vehicle and a vehicle antenna.

2. Description of the Related Art

Generally, a vehicle refers to a transportation designed to travel on a road or railway using fossil fuel, electric power, and the like as a power source.

In recent years, vehicles are, beyond transporting materials and personnel, provided to include audio devices and video devices so that drivers may listen to music and view images while travelling, and also include a navigation device that displays a route to a destination.

For this reason, there is an increasing demand for a vehicle to communicate with an external device. For example, in the case of a navigation function for guiding a route to a destination, the vehicle may receive a global positioning system (GPS) signal from a GPS satellite to determine the location of the vehicle. The vehicle may receive a radio broadcast signal and/or a multimedia broadcast signal to reproduce broadcast sound and/or image. In addition, the vehicle may communicate with a mobile communication base station and/or other vehicles via a mobile communication service.

The vehicle may be provided with an antenna for communication with external devices. In particular, since the frequency of the GPS signal, the frequency of the broadcast signal, and the frequency of the mobile communication signal are different from each other, the vehicle is provided with a plurality of antennas having different shapes. In addition, the plurality of antennas may be integrally provided with each other.

On the other hand, the conventional antennas are assembled on the roof of the vehicle in the form of a shark pin or in the form of a pole, and thus are exposed to the outside. As a result, restrictions arise in the design and size of the antenna. For example, the antennas may include an AM/FM radio antenna, a global navigation satellite system (GNSS) antenna, a distributed matching antenna (DMA), and a mobile communication antenna, in which the four antennas are integrated with each other, thereby causing restriction in the design and size for safety reasons.

SUMMARY

Therefore, it is an object of the disclosure to provide an antenna apparatus built into a roof rail of a vehicle, and a vehicle including the antenna apparatus.

It is another object of the disclosure to provide an antenna apparatus including a plurality of antenna modules disposed at different positions on a roof rail of a vehicle, and a vehicle including the antenna apparatus.

The technical objectives of the disclosure are not limited to the above, and other objectives may become apparent to those of ordinary skill in the art based on the following descriptions.

According to an aspect of the disclosure, there is provided a vehicle including a plurality of antennas, the vehicle including: a roof panel installed on an upper side of the vehicle, the roof panel including first and second coupling areas; a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein the first antenna module is disposed in the first coupling area, and the first antenna module is inserted into the first roof rail, the second antenna module is disposed in the second coupling area, and the second antenna module is inserted into the second roof rail, and ach of the first and second antenna modules includes antennas disposed according to operating frequencies thereof in each of the first and second antenna modules.

In each of the first and second antenna modules, an antenna having a greater operating frequency may be located in front of an antenna having a smaller operating frequency.

In each of the first and second antenna modules, antennas having overlapping operating frequencies may be maximally spaced from each other.

The plurality of antennas may include an analog broadcasting antenna, a digital broadcasting antenna, a satellite navigation antenna, and first and second mobile communication antennas, the first antenna module may include the analog broadcasting antenna and the first mobile communication antenna, and the second antenna module may include the digital broadcasting antenna, the satellite navigation antenna, and the second mobile communication antenna.

In the first antenna module, the first mobile communication antenna may be disposed in front of the analog broadcasting antenna.

In the second antenna module, the satellite navigation antenna, the digital broadcasting antenna, and the second mobile communication antenna may be sequentially arranged from a front side in the second antenna module.

The plurality of antennas may include first and second analog broadcasting antennas, a digital broadcasting antenna, a satellite navigation antenna, and first and second mobile communication antennas, the first antenna module may include the first analog broadcasting antenna, the digital broadcasting antenna, and the first mobile communication antenna, and the second antenna module may include the second analog broadcasting antenna, the satellite navigation antenna, and the second mobile communication antenna.

In the first antenna module, the first mobile communication antenna, the digital broadcasting antenna, and the first analog broadcasting antenna may be sequentially arranged from a front side in the first antenna module.

In the second antenna module, the satellite navigation antenna, the second analog broadcasting antenna, and the second mobile communication antenna may be sequentially arranged from a front side in the second antenna module.

The first roof rail and the second roof rail may extend from a front side to a rear side of the roof panel, the roof panel may include a first front coupling area coupled to a front side of the first roof rail, a first rear coupling area coupled to a rear side of the first roof rail, a second front coupling area coupled to a front side of the second roof rail, and a second rear coupling area coupled to a rear side of the second roof rail, and the first antenna module and the second antenna module may be disposed in different coupling areas among the first front coupling area, the first rear coupling area, the second front coupling area, and the second rear coupling area.

The first roof rail may extend from a front side to a rear side of the roof panel, and includes a first body portion, a first front support portion coupled to the front side of the roof panel, and a first rear support portion coupled to the rear side of the roof panel, the second roof rail may extend from the front side to the rear side of the roof panel, and includes a second body portion, a second front support portion coupled to the front side of the roof panel, and a second rear support portion coupled to the rear side of the roof panel, and the first antenna module and the second antenna module may be inserted into different support portions among the first front support portion, the first rear support portion, the second front support portion, and the second rear support portion.

The plurality of antennas may be disposed in the first antenna module and the second antenna module in a distributed manner based on an operating frequency of each of the plurality of antennas.

According to another aspect of the disclosure, there is provided a vehicle including a plurality of antennas, the vehicle including: a roof panel installed on an upper side of the vehicle, the roof panel including a first front coupling area, a second front coupling area, a first rear coupling area, and a second rear coupling area; a first roof rail and a second roof rail extending side by side from a front side to a rear side of the roof panel, wherein a front side of the first roof rail is coupled to the roof panel in the first front coupling area, a front side of the second roof rail is coupled to the roof panel in the second front coupling area, a rear side of the first roof rail is coupled to the roof panel in the first rear coupling area, and a rear side of the second roof rail is coupled to the roof panel in the second rear coupling area; and first, second, third and fourth antenna modules disposed on the roof panel, wherein the first antenna module is disposed in the first front coupling area, and the first antenna module is inserted into the first roof rail; the second antenna module is disposed in the second front coupling area, and the second antenna module is inserted into the second roof rail; the third antenna module is disposed in the first rear coupling area, and the third antenna module is inserted into the first roof rail; and the fourth antenna module is disposed in the second rear coupling area, and the fourth antenna module is inserted into the second roof rail, each of the first, second, third and fourth antenna modules includes antennas disposed according to operating frequencies thereof in each of the first, second, third and fourth antenna modules.

The plurality of antennas may include an analog broadcasting antenna, a digital broadcasting antenna, a satellite navigation antenna, and first, second, third and fourth mobile communication antennas, the first antenna module includes the analog broadcasting antenna and the first mobile communication antenna, the second antenna module includes the digital broadcasting antenna and the second mobile communication antenna, the third antenna module includes the satellite navigation antenna and the third mobile communication antenna, and the fourth antenna module includes the fourth mobile communication antenna.

The plurality of antennas may include first and second analog broadcasting antennas, a digital broadcasting antenna, a satellite navigation antenna, first, second, third and fourth mobile communication antennas, and first and second vehicle to everything (V2X) communication antennas, the first antenna module may include the first analog broadcasting antenna, the first mobile communication antenna, and the first V2X communication antenna, the second antenna module may include the second analog broadcasting antenna and the second mobile communication antenna, the third antenna module may include the satellite navigation antenna and the third mobile communication antenna, and the fourth antenna module includes the digital broadcasting antenna, the fourth mobile communication antenna, and the second V2X communication antenna.

According to another aspect of the disclosure, there is provided an antenna apparatus including a plurality of antennas for a vehicle, the antenna apparatus including: a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail; the second antenna module is to be disposed in a second coupling area, in which a second roof rail of the vehicle is coupled to the roof panel, and inserted into the second roof rail; and each of the first and second antenna modules includes antennas disposed according to operating frequencies thereof in each of the first and second antenna modules.

In each of the first and second antenna modules, an antenna having a greater operating frequency may be located in front of an antenna having a smaller operating frequency.

In each of the first and second antenna modules, antennas with overlapping operating frequencies may be maximally spaced from each other.

The plurality of antennas may include an analog broadcasting antenna, a digital broadcasting antenna, a satellite navigation antenna, and first and second mobile communication antennas, in the first antenna module, the first mobile communication antenna may be disposed in front of the analog broadcasting antenna, and in the second antenna module, the satellite navigation antenna, the digital broadcasting antenna, and the second mobile communication antenna may be sequentially disposed from a front side in the second antenna module.

The plurality of antennas may include first and second analog broadcasting antennas, a digital broadcasting antenna, a satellite navigation antenna, and first and second mobile communication antennas, in the first antenna module, the first mobile communication antenna, the digital broadcasting antenna, and the first analog broadcasting antenna may be sequentially disposed from a front side in the first antenna module, and in the second antenna module, the satellite navigation antenna, the second analog broadcasting antenna, and the second mobile communication antenna may be sequentially disposed from a front side in the second antenna module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
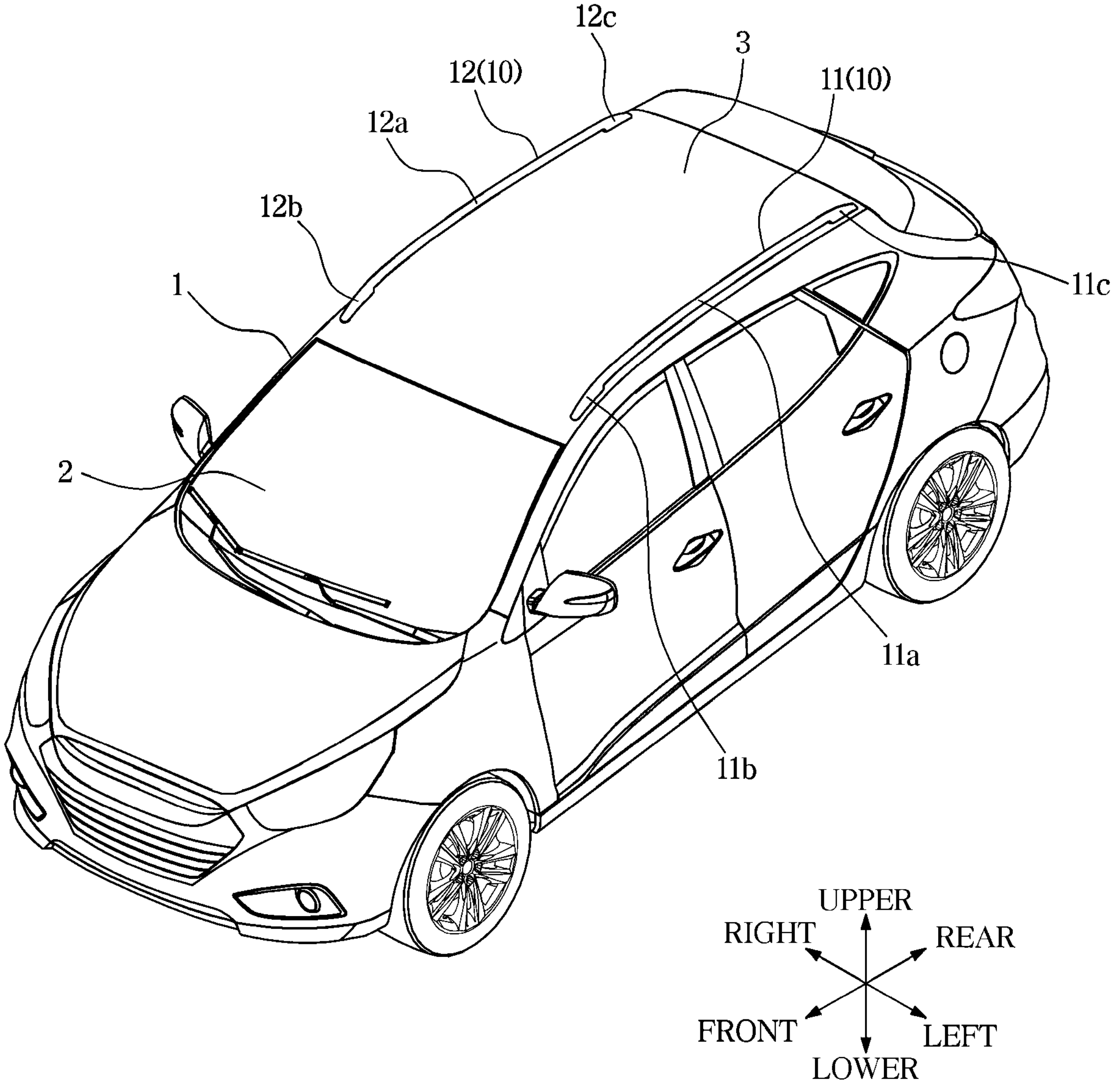
FIG. 1 is a view illustrating a vehicle according to an embodiment.

Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may in addition include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless there are obvious exceptions in the context.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 2:
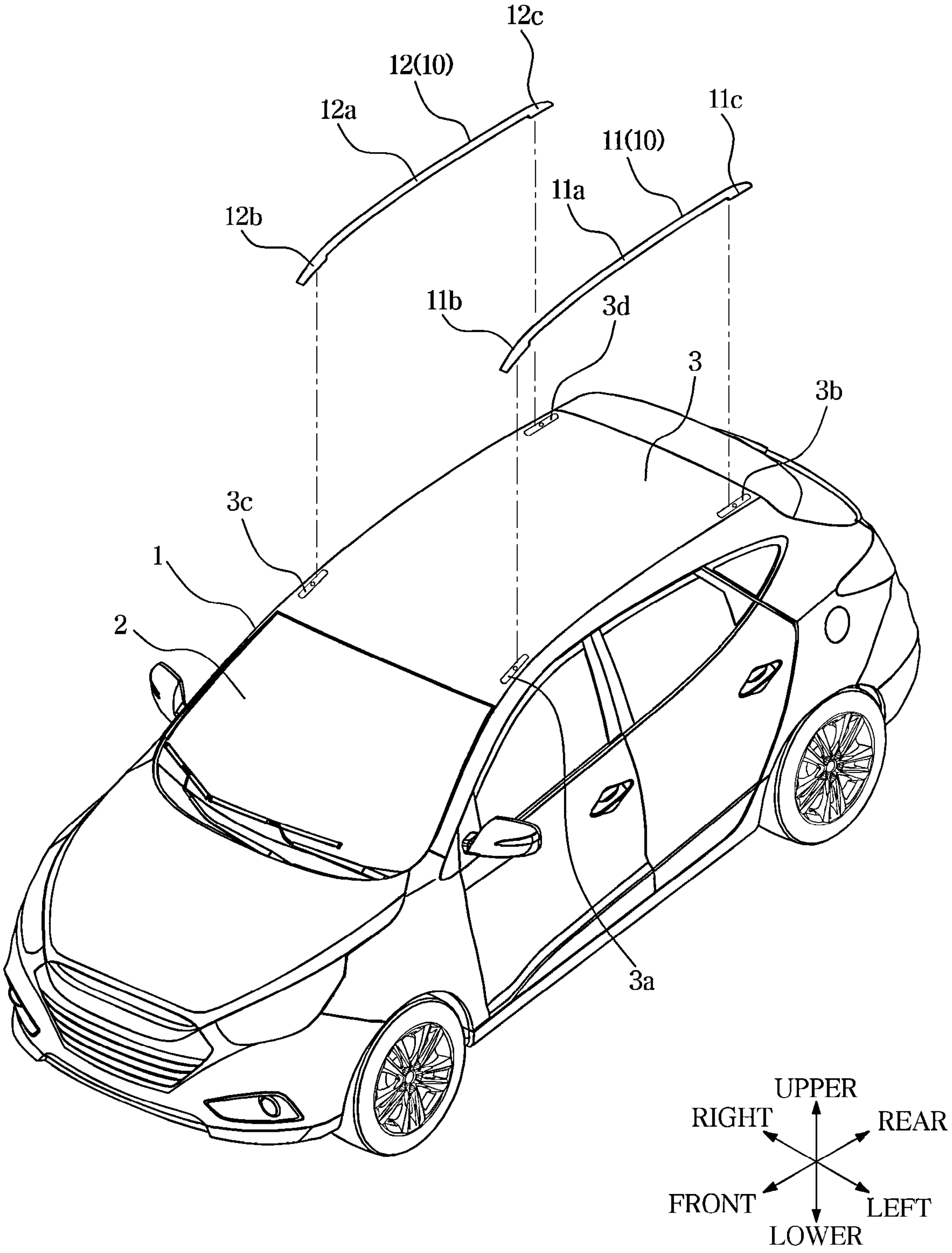
FIG. 2 is a view illustrating a state in which roof rails of a vehicle according to an embodiment are separated.

FIG. 1 is a view illustrating a vehicle according to an embodiment. FIG. 2 is a view illustrating a state in which roof rails of a vehicle according to an embodiment is separated.

A vehicle 1 may include a body that forms the external appearance of the vehicle 1 and accommodates a driver and/or luggage, a chassis including components of the vehicle 1 other than the body, and electronic and installed part that protect the driver or provide convenience to the driver. The body may form an interior space in which the driver may stay, an engine room for accommodating an engine, and a trunk room for accommodating cargo. The chassis may include devices that generate power and allow the vehicle 1 to travel/brake/steer so that the vehicle 1 may travel according to the driver's control. Electronic and installed parts may provide control of the vehicle 1, safety and convenience of the driver and passengers.

As shown in FIG. 1, the vehicle 1 may be provided on a front side with a front window 2 that protects the driver from the outside of the vehicle 1 and secures a front view of a driver, and may be provided on an upper side with a roof panel 3 that forms a cabin of the vehicle 1 and corresponds to the ceiling of the cabin.

On the roof panel 3, a pair of roof rails 10 may be provided.

The roof rail 10 may include a first roof rail 11 fixed to one side of the roof panel 3 of the vehicle 1 and a second roof rail 12 fixed to the other side of the roof panel 3.

For example, as shown in FIG. 1, the first roof rail 11 and the second roof rail 12 may each have a bar shape, and may be disposed in the longitudinal direction based on the travelling direction of the vehicle 1. In addition, the first roof rail 11 may be disposed on a left portion of the roof panel 3, and the second roof rail 12 may be disposed on a right portion of the roof panel 3.

The roof rail 10 may be formed of a plastic polymer compound and may be provided on the upper side of the vehicle 1. For example, in order to reduce air resistance due to the roof rail 10, the roof rail 10 may extend from the front of the roof panel 3 to the rear of the roof panel 3 along the roof panel 3.

The roof rail 10 may fix a roof rack that loads cargo on the upper side of the vehicle 1. For example, the roof rack may be provided detachably on the roof rail 10, and cargo may be loaded on the roof rack.

The roof rail 10 may have both ends fixed to the roof panel 3 of the vehicle 1 and a central portion spaced apart from the roof panel 3 of the vehicle 1.

For example, the first roof rail 11 may include a first body portion 11*a* having a bar shape and fixing the roof rack, a first front support portion 11*b* coupled to the roof panel 3 at a front side of the first body portion 11*a*, and a first rear support portion 11*c* coupled to the roof panel 3 at a rear side of the first body portion 11*a*. The first body portion 11*a*, the first front support portion 11*b*, and the first rear support portion 11*c* may be integrally formed with each other, or the first body portion 11*a*, the first front support portion 11*b*, and the first rear support portion 11*c* may be separately formed and assembled with each other.

In addition, the second roof rail 12 may include a second body portion 12*a* having a bar shape and fixing the roof rack, a second front support portion 12*b* coupled to the roof panel 3 at a front side of the second body portion 12*a*, and a second rear support portion 12*c* coupled to the roof panel 3 at a rear side of the second body portion 12*a*. The second body portion 12*a*, the second front support portion 12*b*, and the second rear support portion 12*c* may be integrally formed with each other, or the second body portion 12*a*, the second front support portion 12*b*, and the second rear support portion 12*c* may be separately formed and assembled with each other.

The roof rail 10 may have a hollow formed therein for weight reduction. In particular, hollows may be formed in support portions 11*b*, 11*c*, 12*b*, and 12*c* supporting the roof rail 10. A plurality of antennas may be inserted into each of the inner hollows of the support portions 11*b*, 11*c*, 12*b*, and 12*c*.

The roof panel 3 may be provided with coupling portions 3*a*, 3*b*, 3*c*, and 3*d* coupled to the support portions 11*b*, 11*c*, 12*b*, and 12*c* of the roof rails 10.

For example, as shown in FIG. 2, the coupling portions 3*a*, 3*b*, 3*c*, and 3*d* may be respectively disposed at four corners of the roof panel 3. A first front coupling portion 3*a* may be coupled to a first front support portion 11*b* of the first roof rail 11 at the front left side of the roof panel 3, a first rear coupling portion 3*b* may be coupled to a first rear support portion 11*c* of the first roof rail 11 at the rear left side of the roof panel 3, a second front coupling portion 3*c* may be coupled to a second front support portion 12*b* of the second roof rail 12 at the front right side of the roof panel 3, and a second rear coupling portion 3*d* may be coupled to a second rear support portion 12*c* of the second roof rail 12 at the rear right side of the roof panel 3.

In at least two of the coupling portions among the coupling portions 3*a*, 3*b*, 3*c*, and 3*d*, antenna modules may be provided, respectively.

The antenna apparatus of the vehicle 1 may include a plurality of antenna modules, and the antenna modules may be disposed on at least two coupling portions among the coupling portions 3*a*, 3*b*, 3*c*, and 3*d*. Specifically, the antenna modules may be disposed on at least two coupling portions of the coupling portions 3*a*, 3*b*, 3*c*, and 3*d*, and may be inserted into the hollows of the support portions 11*b*, 11*c*, 12*b*, and 12*c* of the roof rails 10 when the roof rails 10 are coupled to the roof panel 3.

Each of the antenna modules may include a plurality of antennas capable of transmitting and receiving wireless signals of different frequencies.

The antenna modules may be disposed in different coupling portions 3*a*, 3*b*, 3*c*, and 3*d*, and the antenna modules may be spatially spaced apart from each other. Thereby, the antenna modules may provide spatial diversity.

The vehicle 1 may include a plurality of antennas disposed in the antenna modules in a distributed manner. The plurality of antennas may be antennas capable of transmitting and receiving wireless signals in various frequency ranges for various purposes.

For example, the plurality of antennas may include an antenna for receiving analog broadcasting, an antenna for receiving digital broadcasting, an antenna for satellite navigation, an antenna for mobile communication, an antenna for vehicle communication, and the like.

Analog broadcasting may include AM broadcasting and FM broadcasting. AM broadcasting may use a wireless signal in a frequency range of approximately 500 kHz to 1,800 kHz, and FM broadcasting may use a wireless signal in a frequency range of approximately 70 MHz to 110 MHz.

The antenna apparatus of the vehicle 1 may include an analog broadcasting antenna to receive analog broadcast, and may receive not only an FM broadcast signal but also an AM broadcast signal through the analog broadcasting antenna.

Digital broadcasting may include Digital Multimedia Broadcasting (DMB) broadcasting (Korea and Europe) and SXM broadcasting (USA). DMB broadcasting may use a wireless signal in a frequency range of approximately 174 MHz to 240 MHz, and SXM broadcasting may use a wireless signal in a frequency range of approximately 2300 MHz to 2350 MHz.

The antenna apparatus may include a digital broadcasting antenna to receive digital broadcasting. The digital broadcasting antenna may receive DMB broadcasting or SXM broadcasting according to regions.

The antenna apparatus may receive a global navigation satellite system (GNSS) signal for satellite navigation. The GNSS signal may be a wireless signal in a frequency range of approximately 1,164 MHz to 1,300 MHz, or a wireless signal in a frequency range of approximately 1,559 MHz to 1,610 MHz.

The antenna apparatus may include a GNSS antenna to receive a GNSS signal.

Mobile communication may use a wireless signal in a frequency range of approximately 600 MHz to 5,000 MHz. Mobile communication may require one, or two or more antennas depending on the mobile communication generation. For example, 3G mobile communication requires one antenna, but 4G mobile communication requires two antennas. In addition, 5G mobile communication requires four antennas to apply Multiple Input Multiple Output (MIMO).

The antenna apparatus may include four mobile communication antennas to support 3G and 4G mobile communication as well as 5G mobile communication. For example, the antenna apparatus may include a first mobile communication antenna, a second mobile communication antenna, a third mobile communication antenna, and a fourth mobile communication antenna.

Vehicle communication may use a wireless signal in a frequency range of approximately 5.8 GHz to 6.0 GHz. The vehicle communication (vehicle to everything: V2X) may include vehicle to vehicle (V2V), vehicle to infrastructure (V21), vehicle to network (vehicle to Nomadic device, V2N), vehicle to pedestrian (V2P), and the like. In addition, vehicle communication may require two V2X communication antennas for spatial diversity.

The antenna apparatus may include two V2X communication antennas to support V2X communication. For example, the antenna apparatus may include a first V2X communication antenna and a second V2X communication antenna.

As such, the antenna apparatus may include a plurality of antennas. For example, the antenna apparatus may include an analog broadcasting antenna, a digital broadcasting antenna, a GNSS antenna, two or four mobile communication antennas, and two V2X communication antennas. In other words, the vehicle 1 may include seven or nine antennas.

As described above, the antenna apparatus may include at least two antenna modules. Here, the plurality of antennas may be disposed in at least two antenna modules in a distributed manner. For example, seven or nine antennas may be disposed in two antenna modules in a distributed manner, or seven or nine antennas may be disposed in three antenna modules in a distributed manner, or seven or nine antennas may be disposed in four antenna modules in a distributed manner.

Hereinafter, an example in which a plurality of antennas are disposed in at least two antenna modules in a distributed manner is described.

Figure 3:
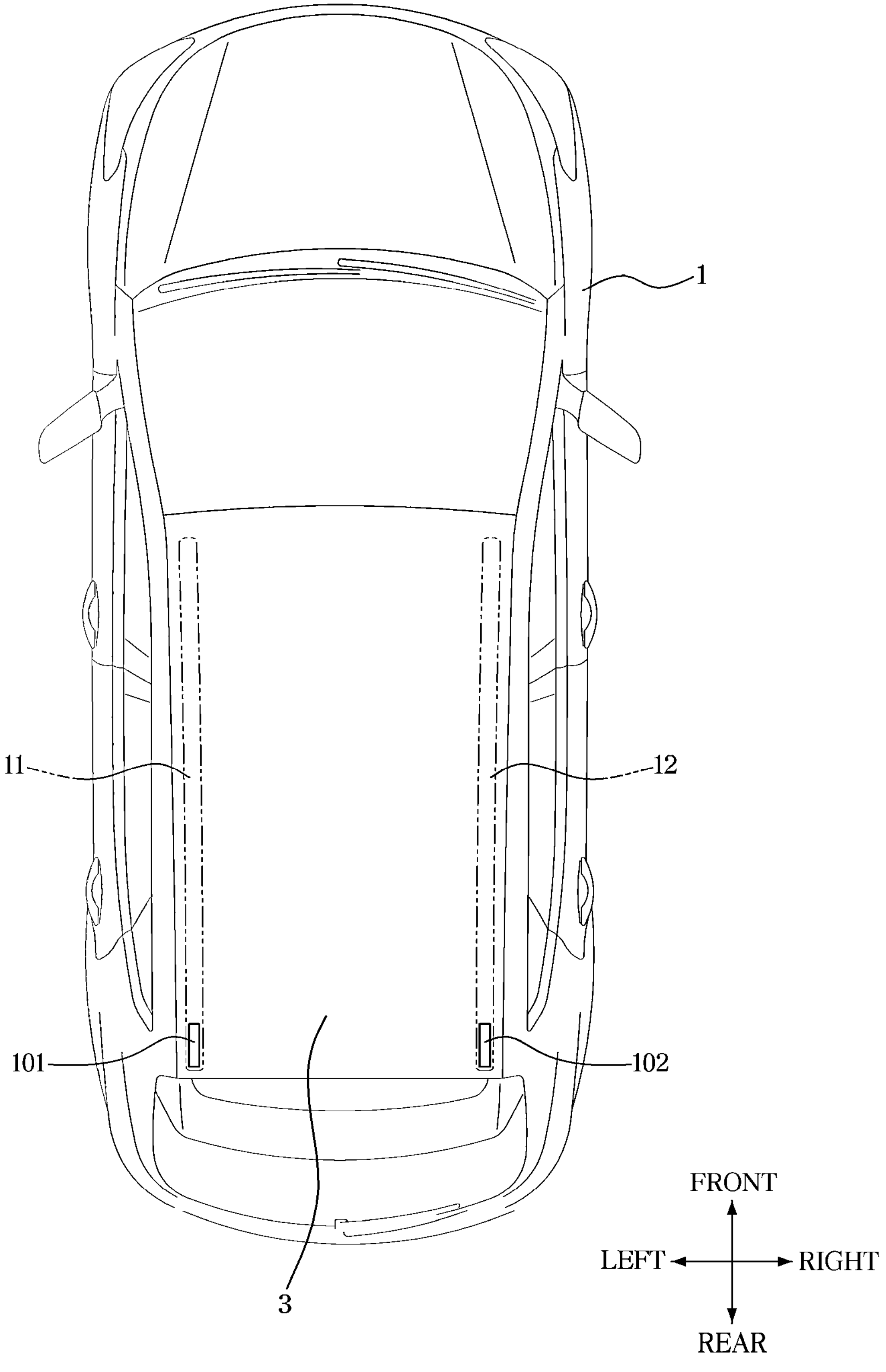
FIGS. 3, 4, and 5 are views illustrating an example of the arrangement of antenna modules included in a vehicle according to an embodiment.
Figure 4:
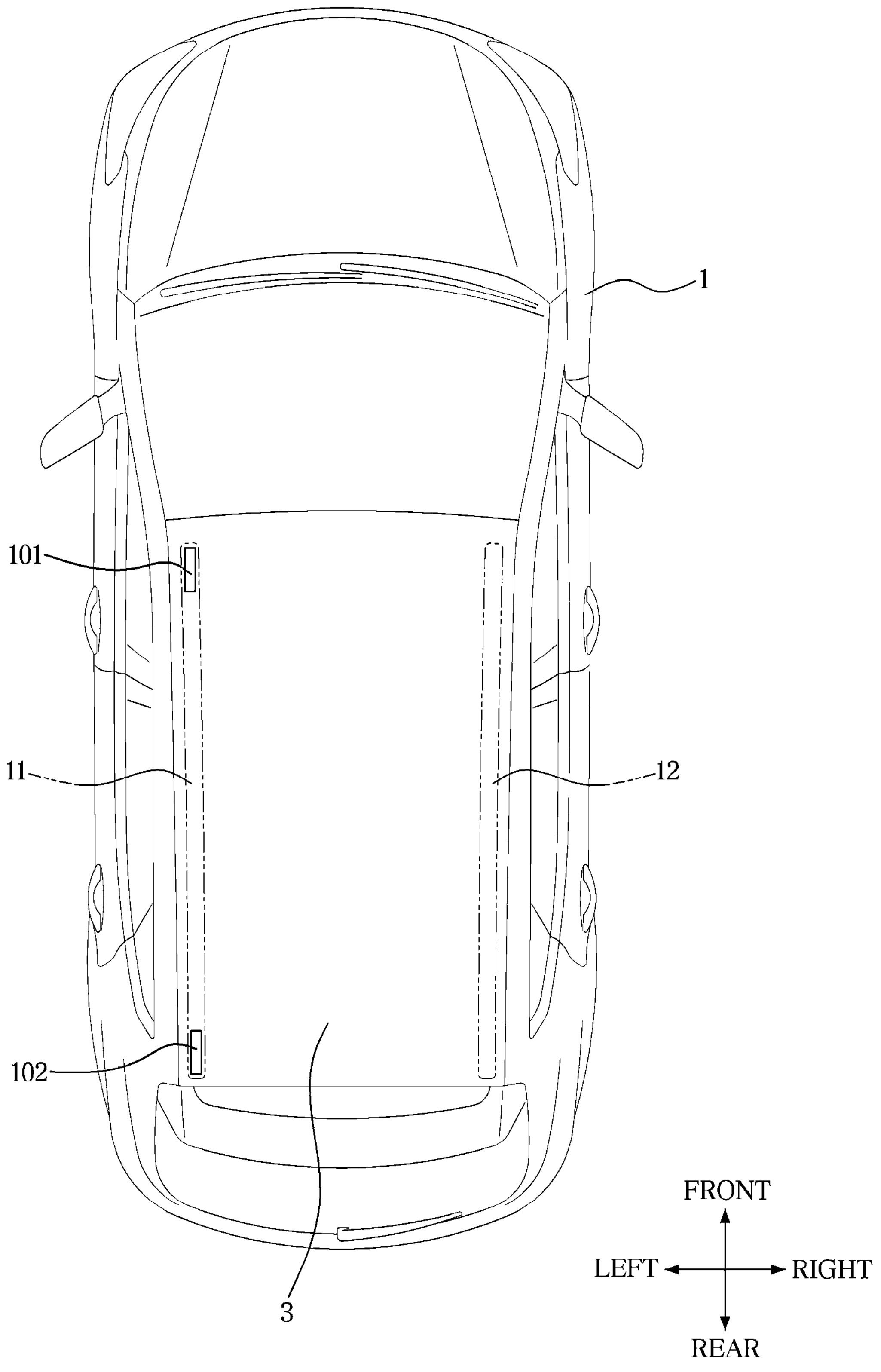
Figure 5:
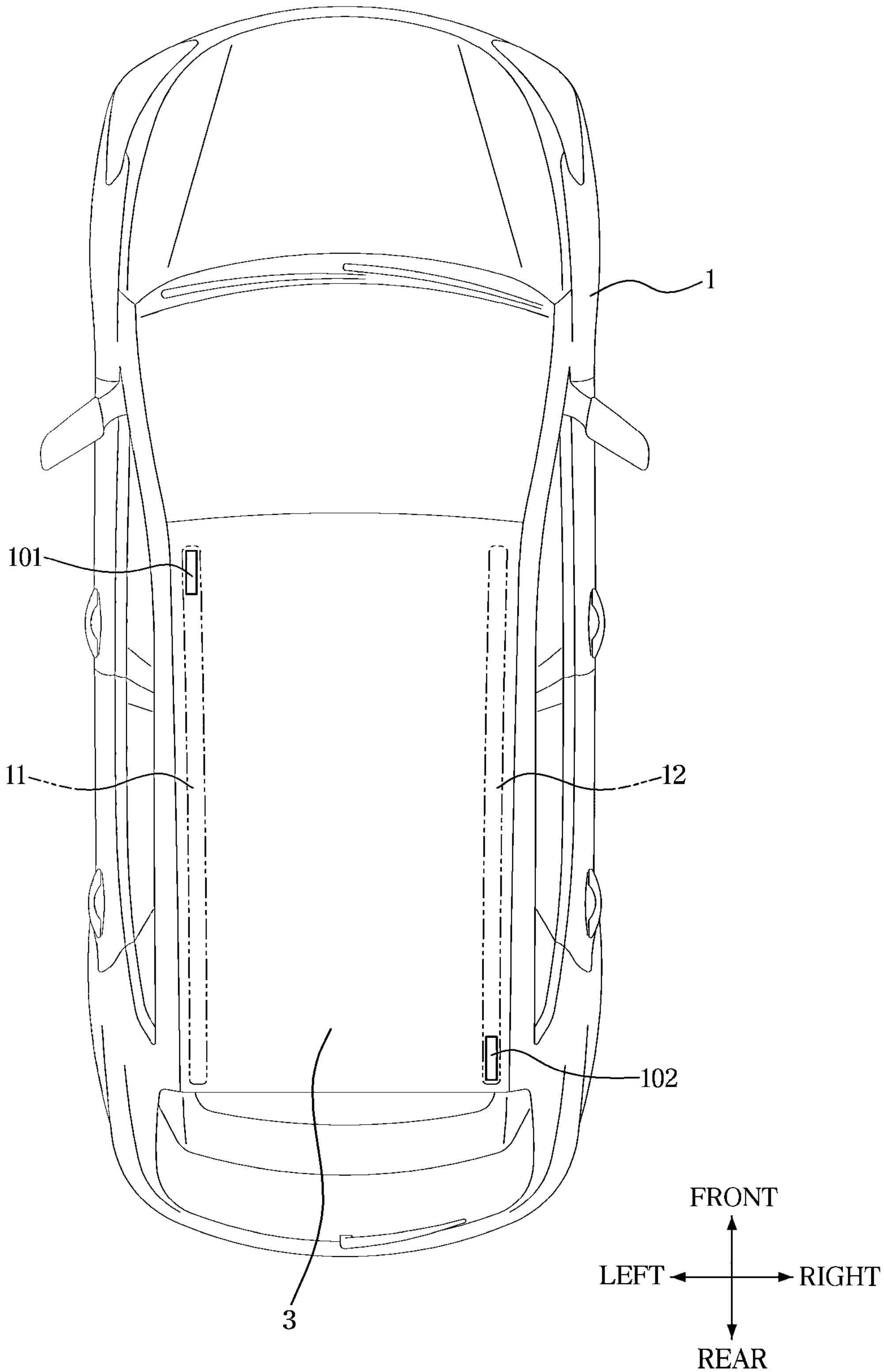

FIGS. 3, 4, and 5 are views illustrating an example of the arrangement of antenna modules included in a vehicle according to an embodiment.

Referring to FIGS. 3, 4 and 5, the antenna apparatus may include a first antenna module 101 and a second antenna module 102.

For example, as shown in FIG. 3, the first antenna module 101 may be provided in the first rear support portion 11*c* of the first roof rail 11, and the second antenna module 102 may be provided in the second rear support portion 12*c* of the second roof rail 12. In FIG. 3, the antenna modules 101 and 102 are illustrated as being provided in the rear support portions 11*c* and 12*c*, respectively, but the disclosure is not limited thereto. For example, the antenna modules 101 and 102 may be provided in the front support portions 11*b* and 12*b*, respectively.

As another example, as shown in FIG. 4, the first antenna module 101 may be provided in the first front support portion 11*b* of the first roof rail 11, and the second antenna module 102 may be provided in the first rear support portion 11*c* of the first roof rail 11. In FIG. 4, the antenna modules 101 and 102 are illustrated as being provided in the support portions 11*b* and 11*c* of the first roof rail 11, respectively, but the disclosure is not limited thereto. For example, the antenna modules 101 and 102 may be provided in the support portions 12*b* and 12*c* of the second roof rail 12, respectively.

As another example, as shown in FIG. 5, the first antenna module 101 may be provided in the first front support portion 11*b* of the first roof rail 11, and the second antenna module 102 may be provided in the second rear support portion 12*c* of the second roof rail 12. However, the disclosure is not limited thereto, and the first antenna module 101 may be provided in the first rear support portion 11*c* of the first roof rail 11, and the second antenna module 102 may be provided in the second front support portion 12*b* of the second roof rail 12.

A plurality of antennas may be disposed in the first antenna module 101 and the second antenna module 102 in a distributed manner.

For example, in the first antenna module 101 and the second antenna module 102, an analog broadcasting antenna, a digital broadcasting antenna, a GNSS antenna, and first and second mobile communication antennas may be disposed in a distributed manner. In other words, the antenna apparatus may support 4G mobile communication.

The size of the antenna may be inversely proportional to the frequency of the wireless signal and proportional to the wavelength of the wireless signal. Accordingly, the analog broadcasting antenna may be larger than the digital broadcasting antenna, the digital broadcasting antenna may be larger than the first and second mobile communication antennas, and the first and second mobile communication antennas may be larger than the GNSS antenna. In order to reduce the size of the antenna module, antennas of having a large size may be arranged separately from each other.

In the first antenna module 101, an analog broadcasting antenna and a first mobile communication antenna may be disposed, and in the second antenna module 102, a digital broadcasting antenna, a GNSS antenna, and a second mobile communication antenna may be disposed. As such, the analog broadcasting antenna and the digital broadcasting antenna having a large size may be separately disposed.

As another example, in the first antenna module 101 and the second antenna module 102, first and second analog broadcasting antennas, a digital broadcasting antenna, a GNSS antennas, and first and second mobile communication antennas may be disposed in a distributed manner.

In the first antenna module 101, a first analog broadcasting antenna, a digital broadcasting antenna, and a first mobile communication antenna may be disposed, and in the second antenna module 102, a second analog broadcasting antenna, a GNSS antenna, and a second mobile communication antenna may be disposed. As such, the first analog broadcasting antenna and the second analog broadcasting antenna having a large size may be separately disposed.

Figure 6A:
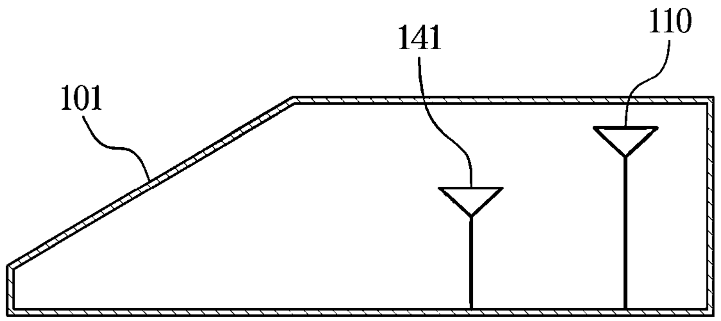
FIGS. 6A and 6B are views illustrating examples of the arrangement of a plurality of antennas in an antenna module included in a vehicle according to an embodiment.
Figure 6B:
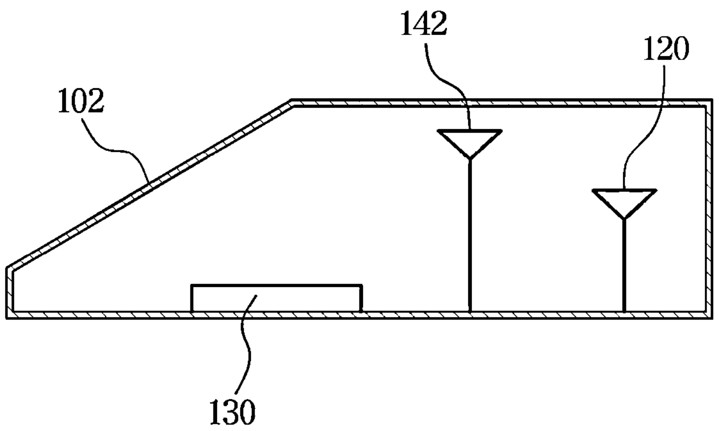

FIGS. 6A and 6B are views illustrating examples of the arrangement of a plurality of antennas in an antenna module included in a vehicle according to an embodiment.

As shown in FIG. 6A, an analog broadcasting antenna 110 and a first mobile communication antenna 141 may be disposed in the first antenna module 101.

The analog broadcasting antenna 110 may include, for example, a rigid printed circuit board (rigid PCB). The analog broadcasting antenna 110 may be configured by a conductor, via, or the like of a PCB. However, the disclosure is not limited thereto, and the analog broadcasting antenna 110 may be implemented as a dipole antenna or a helical antenna.

The first mobile communication antenna 141 may include a flexible printed circuit board (FPCB). The first mobile communication antenna 141 may be configured by a conductor of a FPCB or the like. However, the disclosure is not limited thereto, and the first mobile communication antenna 141 may be implemented as a metal antenna structure or a rigid PCB.

As described above, the operating frequency of the first mobile communication antenna 141 is greater than the operating frequency of the analog broadcasting antenna 110. In other words, the wavelength of the wireless signal transmitted and received by the first mobile communication antenna 141 is shorter than the wavelength of the wireless signal transmitted and received by the analog broadcasting antenna 110. Accordingly, the size of the analog broadcasting antenna 110 is larger than the size of the first mobile communication antenna 141.

Accordingly, as shown in FIG. 6A, the first mobile communication antenna 141 may be disposed in front of the analog broadcasting antenna 110.

As shown in FIG. 6B, in the second antenna module 102, a digital broadcasting antenna 120, a GNSS antenna 130, and a second mobile communication antenna 142 may be disposed.

The digital broadcasting antenna 120 may include, for example, a rigid PCB, and the second mobile communication antenna 142 may include a flexible PCB. The GNSS antenna 130 may be implemented as a patch antenna, for example.

The operating frequency of the GNSS antenna 130 may partially overlap the operating frequency of the second mobile communication antenna 142. As a result, interference between the GNSS antenna 130 and the second mobile communication antenna 142 may occur. In order to reduce, suppress or prevent the interference, the GNSS antenna 130 may be maximally spaced from the second mobile communication antenna 142 in the second antenna module 102.

For example, as shown in FIG. 6B, in the second antenna module 102, the GNSS antenna 130, the digital broadcasting antenna 120, and the second mobile communication antenna 142 may be sequentially disposed from the front.

Figure 7A:
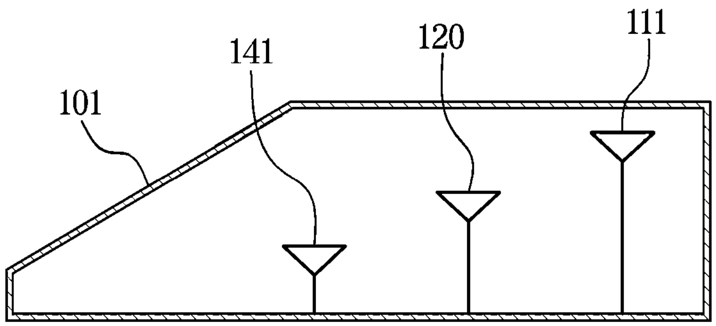
FIGS. 7A and 7B are views illustrating examples of the arrangement of a plurality of antennas in an antenna module included in a vehicle according to an embodiment.
Figure 7B:
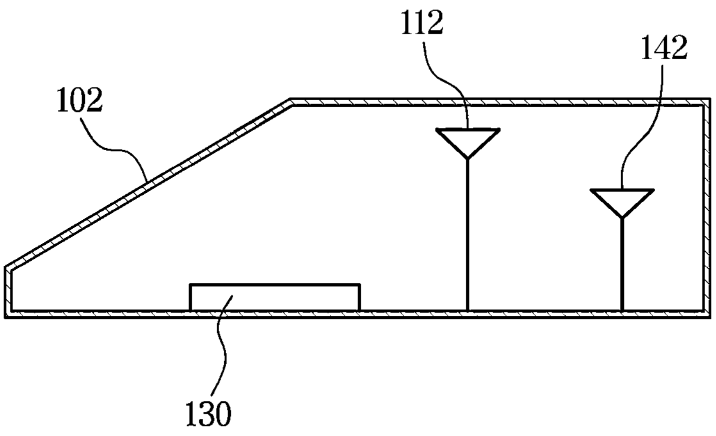

FIGS. 7A and 7B are views illustrating examples of the arrangement of a plurality of antennas in an antenna module included in a vehicle according to an embodiment.

As shown in FIG. 7A, in the first antenna module 101, a first analog broadcasting antenna 111, a digital broadcasting antenna 120, and a first mobile communication antenna 141 may be provided.

The first analog broadcasting antenna 111 and the digital broadcasting antenna 120 may include a rigid PCB, and the first mobile communication antenna 141 may include a FPCB.

The operating frequency of the first mobile communication antenna 141 is greater than the operating frequency of the digital broadcasting antenna 120, and the operating frequency of the digital broadcasting antenna 120 is greater than the operating frequency of the first analog broadcasting antenna 111. Accordingly, the size of the first analog broadcasting antenna 111 is larger than the size of the digital broadcasting antenna 120, and the size of the digital broadcasting antenna 120 is larger than the size of the first mobile communication antenna 141.

Therefore, as shown in FIG. 7A, in the first antenna module 101, the first mobile communication antenna 141, the digital broadcasting antenna 120, and the first analog broadcasting antenna 111 may be sequentially arranged from the front.

As shown in FIG. 7B, in the second antenna module 102, a second analog broadcasting antenna 112, a GNSS antenna 130, and a second mobile communication antenna 142 may be provided.

The second analog broadcasting antenna 112 may include, for example, a rigid PCB, and the second mobile communication antenna 142 may include a FPCB. The GNSS antenna 130 may be implemented as a patch antenna, for example.

The operating frequency of the GNSS antenna 130 may partially overlap the operating frequency of the second mobile communication antenna 142. In order to reduce, suppress or prevent interference between the GNSS antenna 130 and the second mobile communication antenna 142, the GNSS antenna 130 may be maximally spaced apart from the second mobile communication antenna 142 in the second antenna module 102.

As shown in FIG. 7B, in the second antenna module 102, the GNSS antenna 130, the second analog broadcasting antenna 112, and the second mobile communication antenna 142 may be sequentially disposed from the front.

Figure 8:
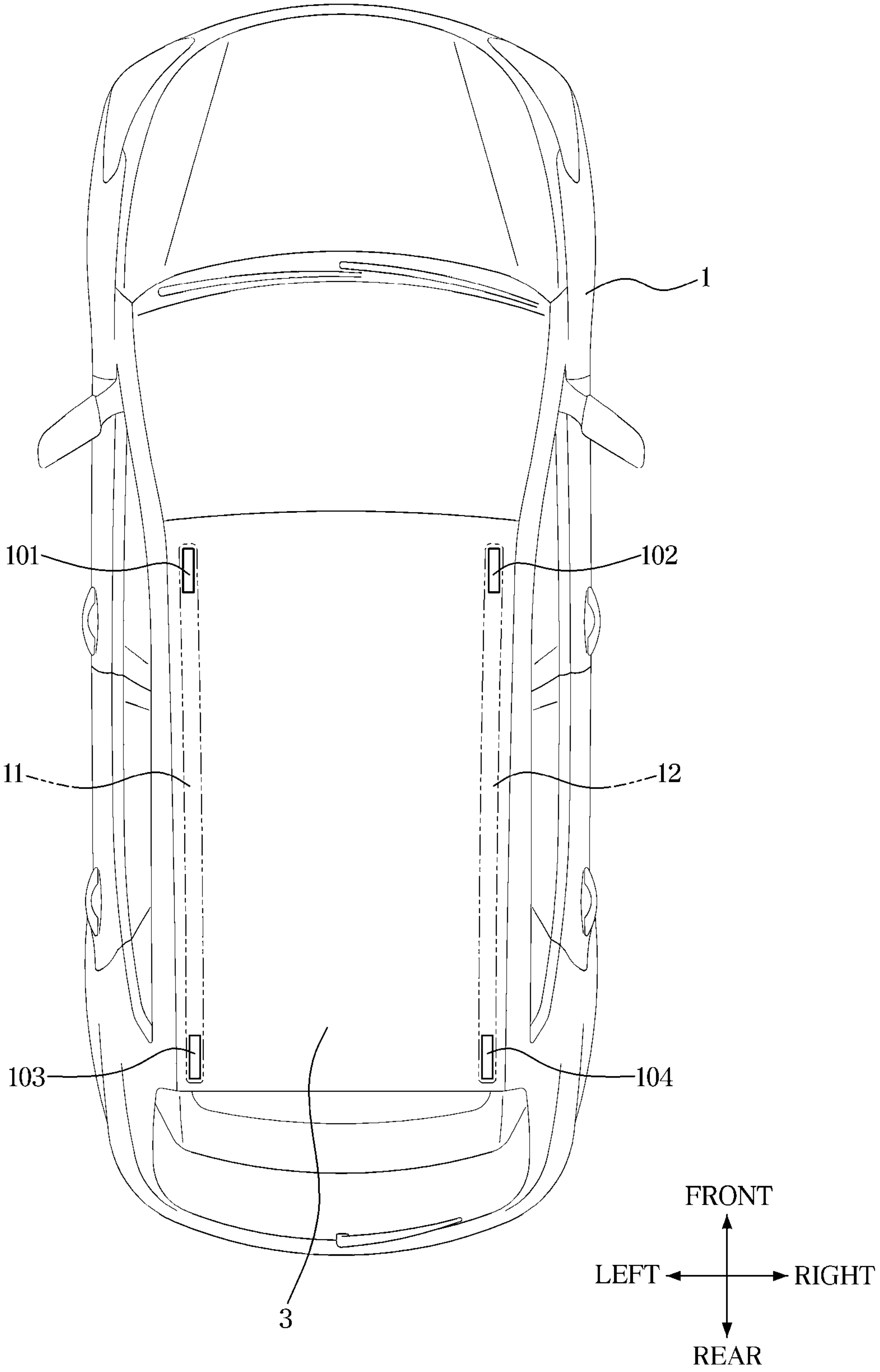
FIG. 8 is a view illustrating an example of the arrangement of antenna modules included in a vehicle according to an embodiment.

FIG. 8 is a view illustrating an example of the arrangement of antenna modules included in a vehicle according to an embodiment.

As shown in FIG. 8, the antenna apparatus may include a first antenna module 101, a second antenna module 102, a third antenna module 103, and a fourth antenna module 104.

For example, as shown in FIG. 8, the first antenna module 101 may be provided in the first front support portion 11*b* of the first roof rail 11, and the second antenna module 102 may be provided in the second front support portion 12*b* of the second roof rail 12. In addition, the third antenna module 103 may be provided in the first rear support portion 11*c* of the first roof rail 11, and the fourth antenna module 104 may be provided in the second rear support portion 12*c* of the second roof rail 12.

In the first, second, third, and fourth antenna modules 101, 102, 103, and 104, a plurality of antennas may be disposed in a distributed manner.

For example, in the first, second, third, and fourth antenna modules 101, 102, 103 and 104, analog broadcasting antennas, digital broadcasting antennas, GNSS antennas, and first and second mobile communication antennas may be disposed in a distributed manner. In particular, in order to reduce the size of the antenna module, the analog broadcasting antenna and the digital broadcasting antenna having a large size may be separately disposed from each other. In other words, the antenna apparatus may support 4G mobile communication.

In the first antenna module 101, an analog broadcasting antenna may be disposed, and in the second antenna module 102, a digital broadcasting antenna may be disposed. In addition, a GNSS antenna and a first mobile communication antenna may be disposed in the third antenna module 103, and a second mobile communication antenna may be disposed in the fourth antenna module 104.

As another example, in the first antenna module 101 and the second antenna module 102, first and second analog broadcasting antennas, digital broadcasting antennas, GNSS antennas, and first and second mobile communication antennas may be disposed in a distributed manner.

In the first antenna module 101, a first analog broadcasting antenna may be disposed, and in the second antenna module 102, a second analog broadcasting antenna may be disposed. In addition, a digital broadcasting antenna and a first mobile communication antenna may be disposed in the third antenna module 103, and a GNSS broadcasting antenna and a second mobile communication antenna may be arranged in the fourth antenna module 104.

As another example, in the first antenna module 101 and the second antenna module 102, an analog broadcasting antenna, a digital broadcasting antenna, a GNSS antenna, first, second, third and fourth mobile communication antennas, and first and second V2X communication antennas may be disposed in a distributed manner. In other words, the antenna apparatus may support 5G mobile communication and V2X communication.

In the first antenna module 101, an analog broadcasting antenna and a first mobile communication antenna may be disposed, and in the second antenna module 102, a digital broadcasting antenna and a second mobile communication antenna may be disposed. In addition, a GNSS antenna, a third mobile communication antenna, and a first V2X communication antenna may be disposed in the third antenna module 103, and a fourth mobile communication antenna and a second V2X communication antenna may be disposed in the fourth antenna module 104. As described above, the analog broadcasting antenna and the digital broadcasting antenna having a large size may be separately arranged from each other, and the four mobile communication antennas may be spaced apart from each other at different positions in the vehicle 1.

As another example, in the first antenna module 101 and the second antenna module 102, first and second analog broadcasting antennas, digital broadcasting antennas, GNSS antennas, and first, second, third and fourth mobile communication antennas, and first and second V2X communication antennas may be disposed in a distributed manner.

In the first antenna module 101, a first analog broadcasting antenna, a first mobile communication antenna, and a first V2X communication antenna may be disposed, and in the second antenna module 102, a second analog broadcasting antenna and a second mobile communication antenna may be disposed. In addition, a GNSS antenna and a third mobile communication antenna may be disposed in the third antenna module 103, and a digital broadcasting antenna, a fourth mobile communication antenna, and a second V2X communication antenna may be disposed in the fourth antenna module 104. As described above, the first analog broadcasting antenna, the second analog broadcasting antenna, and the digital broadcasting antenna having a large size may be separately disposed, and the four mobile communication antennas may be disposed at different positions in the vehicle 1. In addition, the first V2X communication antenna and the second V2X communication antenna may be disposed to be maximally spaced apart from each other.

FIGS. 9A to 9D are views illustrating examples of the arrangement of a plurality of antennas in an antenna module included in a vehicle according to an embodiment.

Figure 9A:
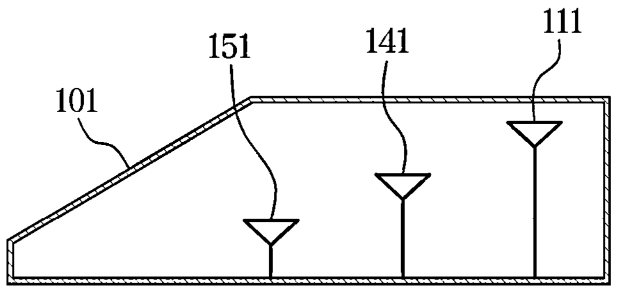
FIGS. 9A to 9D are views illustrating examples of the arrangement of a plurality of antennas in an antenna module included in a vehicle according to an embodiment.

As shown in FIG. 9A, in the first antenna module 101, a first analog broadcasting antenna 111, a first mobile communication antenna 141, and a first V2X communication antenna 151 may be disposed.

The antennas disposed in the first antenna module 101 may be sequentially disposed in the order of the first V2X communication antenna 151, the first mobile communication antenna 141, and the first analog broadcasting antenna 111 from the front in the first antenna module 101 according to the operating frequencies thereof.

Figure 9B:
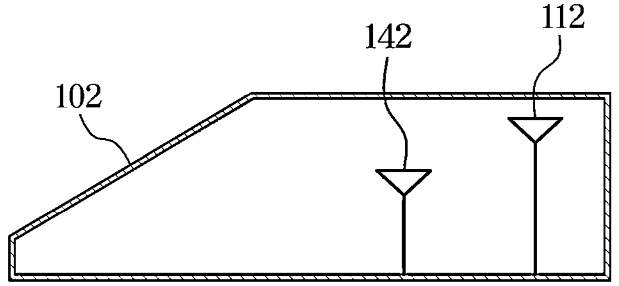

As shown in FIG. 9B, in the second antenna module 102, a second analog broadcasting antenna 112 and a second mobile communication antenna 142 may be disposed.

The antennas disposed in the second antenna module 102 may be sequentially disposed in the order of the second mobile communication antenna 142 and the second analog broadcasting antenna 112 from the front in the second antenna module 102 according to the operating frequencies thereof.

Figure 9C:
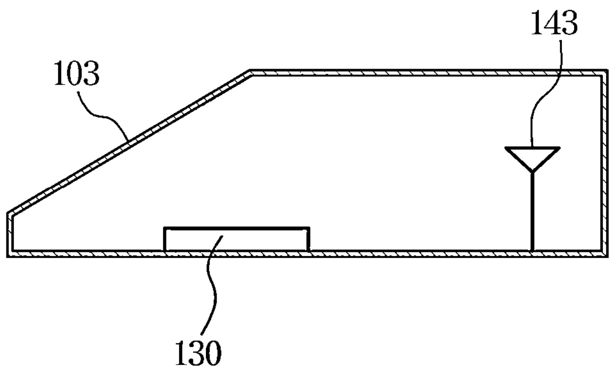

As shown in FIG. 9C, in the third antenna module 103, a GNSS antenna 130 and a third mobile communication antenna 143 may be disposed.

The antennas disposed in the third antenna module 103 may be sequentially disposed in the order of the GNSS antenna 130 and the third mobile communication antenna 143 from the front in the third antenna module 103 according to the operating frequencies thereof. In this case, the GNSS antenna 130 may be maximally spaced apart from the third mobile communication antenna 143.

Figure 9D:
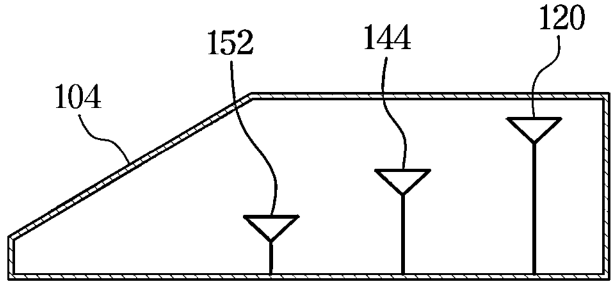

As shown in FIG. 9D, in the fourth antenna module 104, a digital broadcasting antenna 120, a fourth mobile communication antenna 144, and a second V2X communication antenna 152 may be disposed.

The antennas disposed in the fourth antenna module 104 may be sequentially disposed in the order of the second V2X communication antenna 152, the fourth mobile communication antenna 144, and the digital broadcasting antenna 120 from the front in the fourth antenna module 104 according to the operating frequencies thereof.

As described above, the antenna apparatus may include a plurality of antenna modules provided in the roof rail 10 of the vehicle 1. In addition, the plurality of antennas using different frequency wavelengths may be disposed in the plurality of antenna modules in a distributed manner.

In addition, the plurality of antennas provided in each of the plurality of antenna modules may be disposed in the antenna module according to the operating frequencies thereof. For example, an antenna having a greater operating frequency may be positioned in front of an antenna having a smaller operating frequency. In addition, antennas with overlapping operating frequencies may be maximally spaced apart from each other.

Accordingly, interference between wireless signals may be reduced, suppressed or prevented, and spatial diversity may be provided. In addition, by disposing the antennas in a distributed manner, the size of each of the antenna modules may be reduced.

As is apparent from the above, according to one aspect of the disclosure, an antenna apparatus built into a roof rail of a vehicle, and a vehicle including the antenna apparatus can be provided.

According to one aspect of the disclosure, an antenna apparatus including a plurality of antenna modules disposed at different positions on a roof rail of a vehicle, and a vehicle including the antenna apparatus can be provided.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein in each of the first and second antenna modules, an antenna having a greater operating frequency is located in front of an antenna having a smaller operating frequency.

2. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein in each of the first and second antenna modules, antennas having overlapping operating frequencies are maximally spaced from each other.

3. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein the plurality of antennas comprise an analog broadcasting antenna, a digital broadcasting antenna, a satellite navigation antenna, and first and second mobile communication antennas, the first antenna module comprises the analog broadcasting antenna and the first mobile communication antenna, and the second antenna module comprises the digital broadcasting antenna, the satellite navigation antenna, and the second mobile communication antenna.

4. The vehicle of claim 3, wherein, in the first antenna module, the first mobile communication antenna is disposed in front of the analog broadcasting antenna.

5. The vehicle of claim 3, wherein in the second antenna module, the satellite navigation antenna, the digital broadcasting antenna, and the second mobile communication antenna are sequentially arranged from a front side in the second antenna module.

6. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein the plurality of antennas comprise first and second analog broadcasting antennas, a digital broadcasting antenna, a satellite navigation antenna, and first and second mobile communication antennas, the first antenna module comprises the first analog broadcasting antenna, the digital broadcasting antenna, and the first mobile communication antenna, and the second antenna module comprises the second analog broadcasting antenna, the satellite navigation antenna, and the second mobile communication antenna.

7. The vehicle of claim 6, wherein in the first antenna module, the first mobile communication antenna, the digital broadcasting antenna, and the first analog broadcasting antenna are sequentially arranged from a front side in the first antenna module.

8. The vehicle of claim 6, wherein in the second antenna module, the satellite navigation antenna, the second analog broadcasting antenna, and the second mobile communication antenna are sequentially arranged from a front side in the second antenna module.

9. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein the first roof rail and the second roof rail extend from a front side to a rear side of the roof panel, the roof panel includes a first front coupling area coupled to a front side of the first roof rail, a first rear coupling area coupled to a rear side of the first roof rail, a second front coupling area coupled to a front side of the second roof rail, and a second rear coupling area coupled to a rear side of the second roof rail, and the first antenna module and the second antenna module are disposed in different coupling areas among the first front coupling area, the first rear coupling area, the second front coupling area, and the second rear coupling area.

10. A vehicle including a plurality of antennas, the vehicle comprising:

a roof panel installed on an upper side of the vehicle, the roof panel including first and second coupling areas;

a first roof rail and a second roof rail arranged side by side on the roof panel, wherein the first roof rail is coupled to the roof panel in the first coupling area, and the second roof rail is coupled to the roof panel in the second coupling area; and a first antenna module and a second antenna module disposed on the roof panel, wherein:

the first antenna module is disposed in the first coupling area, and the first antenna module is inserted into the first roof rail, the second antenna module is disposed in the second coupling area, and the second antenna module is inserted into the second roof rail, and each of the first and second antenna modules includes antennas disposed according to operating frequencies thereof in each of the first and second antenna modules, wherein the first roof rail extends from a front side to a rear side of the roof panel, and comprises a first body portion, a first front support portion coupled to the front side of the roof panel, and a first rear support portion coupled to the rear side of the roof panel, the second roof rail extends from the front side to the rear side of the roof panel, and comprises a second body portion, a second front support portion coupled to the front side of the roof panel, and a second rear support portion coupled to the rear side of the roof panel, and the first antenna module and the second antenna module are inserted into different support portions among the first front support portion, the first rear support portion, the second front support portion, and the second rear support portion.

11. The vehicle of claim 1, wherein the plurality of antennas are disposed in the first antenna module and the second antenna module in a distributed manner based on an operating frequency of each of the plurality of antennas.

12. A vehicle including a plurality of antennas, the vehicle comprising:

a roof panel installed on an upper side of the vehicle, the roof panel including a first front coupling area, a second front coupling area, a first rear coupling area, and a second rear coupling area;

a first roof rail and a second roof rail extending side by side from a front side to a rear side of the roof panel, wherein a front side of the first roof rail is coupled to the roof panel in the first front coupling area, a front side of the second roof rail is coupled to the roof panel in the second front coupling area, a rear side of the first roof rail is coupled to the roof panel in the first rear coupling area, and a rear side of the second roof rail is coupled to the roof panel in the second rear coupling area; and first, second, third and fourth antenna modules disposed on the roof panel, wherein:

the first antenna module is disposed in the first front coupling area, and the first antenna module is inserted into the first roof rail, the second antenna module is disposed in the second front coupling area, and the second antenna module is inserted into the second roof rail, the third antenna module is disposed in the first rear coupling area, and the third antenna module is inserted into the first roof rail, the fourth antenna module is disposed in the second rear coupling area, and the fourth antenna module is inserted into the second roof rail, each of the first, second, third and fourth antenna modules includes antennas disposed according to operating frequencies thereof in each of the first, second, third and fourth antenna modules, wherein the plurality of antennas comprise an analog broadcasting antenna, a digital broadcasting antenna, a satellite navigation antenna, and first, second, third and fourth mobile communication antennas, the first antenna module comprises the analog broadcasting antenna and the first mobile communication antenna, the second antenna module comprises the digital broadcasting antenna and the second mobile communication antenna, the third antenna module comprises the satellite navigation antenna and the third mobile communication antenna, and the fourth antenna module comprises the fourth mobile communication antenna.

13. A vehicle including a plurality of antennas, the vehicle comprising:

a roof panel installed on an upper side of the vehicle, the roof panel including a first front coupling area, a second front coupling area, a first rear coupling area, and a second rear coupling area;

a first roof rail and a second roof rail extending side by side from a front side to a rear side of the roof panel, wherein a front side of the first roof rail is coupled to the roof panel in the first front coupling area, a front side of the second roof rail is coupled to the roof panel in the second front coupling area, a rear side of the first roof rail is coupled to the roof panel in the first rear coupling area, and a rear side of the second roof rail is coupled to the roof panel in the second rear coupling area; and first, second, third and fourth antenna modules disposed on the roof panel, wherein:

the first antenna module is disposed in the first front coupling area, and the first antenna module is inserted into the first roof rail, the second antenna module is disposed in the second front coupling area, and the second antenna module is inserted into the second roof rail, the third antenna module is disposed in the first rear coupling area, and the third antenna module is inserted into the first roof rail, the fourth antenna module is disposed in the second rear coupling area, and the fourth antenna module is inserted into the second roof rail, each of the first, second, third and fourth antenna modules includes antennas disposed according to operating frequencies thereof in each of the first, second, third and fourth antenna modules, wherein the plurality of antennas comprise first and second analog broadcasting antennas, a digital broadcasting antenna, a satellite navigation antenna, first, second, third and fourth mobile communication antennas, and first and second vehicle to everything (V2X) communication antennas, the first antenna module comprises the first analog broadcasting antenna, the first mobile communication antenna, and the first V2X communication antenna, the second antenna module comprises the second analog broadcasting antenna and the second mobile communication antenna, the third antenna module comprises the satellite navigation antenna and the third mobile communication antenna, and the fourth antenna module comprises the digital broadcasting antenna, the fourth mobile communication antenna, and the second V2X communication antenna.

14. An antenna apparatus including a plurality of antennas for a vehicle, the antenna apparatus comprising:

a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail;

the second antenna module is to be disposed in a second coupling area, in which a second roof rail of the vehicle is coupled to the roof panel, and inserted into the second roof rail; and each of the first and second antenna modules includes antennas disposed according to operating frequencies thereof in each of the first and second antenna modules, wherein in each of the first and second antenna modules, an antenna having a greater operating frequency is located in front of an antenna having a smaller operating frequency.

15. An antenna apparatus including a plurality of antennas for a vehicle, the antenna apparatus comprising:

a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail;

the second antenna module is to be disposed in a second coupling area, in which a second roof rail of the vehicle is coupled to the roof panel, and inserted into the second roof rail; and each of the first and second antenna modules includes antennas disposed according to operating frequencies thereof in each of the first and second antenna modules, wherein in each of the first and second antenna modules, antennas with overlapping operating frequencies are maximally spaced from each other.

16. An antenna apparatus including a plurality of antennas for a vehicle, the antenna apparatus comprising:

a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail;

the second antenna module is to be disposed in a second coupling area, in which a second roof rail of the vehicle is coupled to the roof panel, and inserted into the second roof rail; and each of the first and second antenna modules includes antennas disposed according to operating frequencies thereof in each of the first and second antenna modules, wherein the plurality of antennas comprise an analog broadcasting antenna, a digital broadcasting antenna, a satellite navigation antenna, and first and second mobile communication antennas, in the first antenna module, the first mobile communication antenna is disposed in front of the analog broadcasting antenna, and in the second antenna module, the satellite navigation antenna, the digital broadcasting antenna, and the second mobile communication antenna are sequentially disposed from a front side in the second antenna module.

17. An antenna apparatus including a plurality of antennas for a vehicle, the antenna apparatus comprising:

a first antenna module to be disposed on a roof panel of the vehicle; and a second antenna module to be spaced apart from the first antenna module and disposed on the roof panel, wherein the first antenna module is to be disposed in a first coupling area, in which a first roof rail of the vehicle is coupled to the roof panel, and inserted into the first roof rail;

the second antenna module is to be disposed in a second coupling area, in which a second roof rail of the vehicle is coupled to the roof panel, and inserted into the second roof rail; and each of the first and second antenna modules includes antennas disposed according to operating frequencies thereof in each of the first and second antenna modules, wherein the plurality of antennas comprise first and second analog broadcasting antennas, a digital broadcasting antenna, a satellite navigation antenna, and first and second mobile communication antennas, in the first antenna module, the first mobile communication antenna, the digital broadcasting antenna, and the first analog broadcasting antenna are sequentially disposed from a front side in the first antenna module, and in the second antenna module, the satellite navigation antenna, the second analog broadcasting antenna, and the second mobile communication antenna are sequentially disposed from a front side in the second antenna module.

* * * * *